United States Patent
Sasaki et al.

(12)

(10) Patent No.: US 6,628,115 B2
(45) Date of Patent: Sep. 30, 2003

(54) SCALE LOOPS FOR ELECTROMAGNETIC INDUCTION-TYPE ABSOLUTE POSITION TRANSDUCER

(75) Inventors: Kouji Sasaki, Kawasaki (JP); Yoshiaki Shiraishi, Kawasaki (JP); Nobuyuki Hayashi, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 12 days.

(21) Appl. No.: 10/053,964

(22) Filed: Jan. 22, 2002

(65) Prior Publication Data

US 2002/0097043 A1 Jul. 25, 2002

(30) Foreign Application Priority Data

Jan. 22, 2001 (JP) ........................ 2001-013066

(51) Int. Cl.⁷ ..................... G01B 7/14; G01D 5/20; G08C 19/06; G08C 21/00
(52) U.S. Cl. ................ 324/207.17; 324/207.18; 324/207.24; 340/870.32; 336/45; 336/129
(58) Field of Search ............... 324/207.12, 207.17, 324/207.18, 207.19, 207.24, 207.25; 307/116–118; 341/15; 340/870.32, 870.34–870.36; 318/653, 657, 661; 336/45, 75, 77, 79, 115, 129

(56) References Cited

U.S. PATENT DOCUMENTS

| | | | |
|---|---|---|---|
| 5,886,519 A | * 3/1999 | Masreliez et al. | ..... 324/207.17 |
| 6,329,813 B1 | 12/2001 | Andermo | |
| 2002/0030484 A1 | 3/2002 | Kiriyama et al. | |
| 2002/0030485 A1 | * 3/2002 | Gleixner | ........... 324/207.17 |

FOREIGN PATENT DOCUMENTS

JP      62-211501      * 9/1987

* cited by examiner

Primary Examiner—Jay Patidar
(74) Attorney, Agent, or Firm—Rankin, Hill, Porter & Clark LLP

(57) ABSTRACT

A electromagnetic induction-type absolute position transducer according to the present invention has a plurality of scale loops functioning as coils. The scale loop has first and second loop portions and a connecting pattern portion which connects the corresponding first and second loop portions with each other. The first and second loop portions are arranged along the measuring axis at different wavelength intervals. At least part of the pattern widths constituting scale loops are gradually increased as the length of a connecting pattern portion becomes longer.

7 Claims, 10 Drawing Sheets

SCALE LOOPS FOR ELECTROMAGNETIC INDUCTION-TYPE ABSOLUTE POSITION TRANSDUCER

BACKGROUND OF THE INVENTION

1. Field of the Invention

The present invention relates to an electromagnetic induction-type absolute position transducer in which variation of the signal strength depending on positions on a scale is small. More particularly, the present invention relates to an electromagnetic induction-type absolute position transducer comprising a scale with a plurality of scale loops functioning as coils, the scale loop having a set of loop portions including at least two loop portions, which are arranged along a measuring axis at different wavelength intervals to constitute a plurality of tracks arranged along the measuring axis at different wavelengths, and a connecting pattern portion connecting the corresponding two loop portions with each other. The electromagnetic induction-type absolute position transducer is suitably used in an electronic caliper, an electronic micrometer, an indicator, a linear scale, a linear gauge, and the like.

2. Description of the Related Art

The assignee of the invention has proposed an electromagnetic induction-type absolute position transducer having N (N≧2) tracks of different wavelengths, in Japanese Patent Unexamined Publication No. 2000-180209 (filed based on U.S. patent application Ser. No. 09/213,268). As shown in FIG. 10, the proposed transducer has a scale 10 and a readhead 20 which are relatively movable along a measuring axis X. The readhead 20 includes at least one magnetic flux sensor (receiving coils 22 and 24). The scale 10 has a plurality of closed-loop coupling loops (hereinafter, referred to as scale loops) which extend along the measuring axis. The scale loops function as coils. Each of the scale loops includes a first loop portion 12, a second loop portion 14, and a connecting pattern portion 16 connecting the first and second loop portion with each other. The first loop portions 12 are arranged at intervals corresponding to a first wavelength $\lambda 1$ along the measuring axis. The second loop portions 14 are arranged at intervals corresponding to a second wavelength $\lambda 2$ which is different from the first wavelength $\lambda 1$.

In FIG. 10 a driving circuit 30 selectively outputs a time-varying drive signal to either a first transmitting coil 26 or a second transmitting coil 28. An amplifying circuit 32 amplifies signals from the receiving coils 22 and 24. A calculation device 34 A/D-converts an output of the amplifying circuit 32 and calculates an absolute position from the phase difference between the tracks.

In FIG. 10, the first loop portions 12 are arranged on one side of the second loop portions 14. The first loop portions 12 may be alternately arranged on both the sides of the second loop portions 14 as shown in FIG. 11.

FIG. 12 enlargedly shows connecting stats of 0-th and n-th first loop portions 12 and second loop portions 14 in the scale loops of FIG. 10. FIG. 13 shows variation of the signal strength with respect to the length of the scale loop (hereinafter, referred to as scale length). As shown in FIGS. 12 and 13, in the electromagnetic induction-type absolute position transducer of the related art, the connecting pattern portion 16, which connects loop portions (the first loop portion 12 and the second loop portion 14) of each scale loop in the scale 10, is longer as the scale length is larger. Accordingly, if the pattern widths of the scale loops (pattern widths A of the first and second loop portions, and pattern widths B of the connecting patterns 16) are kept to be constant along the measuring axis as shown in FIG. 12, an output signal of the readhead 20 is lowered in strength as indicated by the solid line A in FIG. 14 as the scale length is larger. That is, the output signal of the readhead is lowered in strength as the readhead moves away from the position of the scale loop having the shortest length connecting pattern portion (hereinafter, referred as 0-th scale loop) Here, the scale pattern of the 0-th scale loop is referred as shortest connecting pattern.

When the signal strength is changed depending on the scale position as described above, the setting range of the gap between the scale and the readhead is inevitably narrowed in order to ensure a sufficient signal strength even when the signal strength is reduced. Therefore, the accuracy of components and an assembling process must be enhanced. Further, in the case where, as proposed by the assignee of the invention in U.S. patent application Ser. No. 09/804,300, an erroneous operation due to, for example, the readhead or a breakage of the scale is detected on the basis of the signal strength, the detection sensitivity cannot be set to be high.

SUMMARY OF THE INVENTION

The invention has been conducted in order to solve the problems of the related art. It is an object of the invention to provide an electromagnetic induction-type absolute position transducer in which variation of an output signal depending on positions on the scale is small.

To achieved the above-mentioned object of the invention, there is provided with an electromagnetic induction-type absolute position transducer comprising a scale with a plurality of scale loops functioning as coils, the scale loop having a set of loop portions including two loop portions, which are arranged along a measuring axis at different wavelength intervals to constitute a plurality of tracks arranged along the measuring axis at different wavelengths, and a connecting pattern portion connecting corresponding two loop portions with each other. In the electromagnetic induction-type absolute position transducer, at least part of pattern widths constituting the scale loops are changed in accordance with the length of the connecting pattern portion (hereinafter, as referred as connecting pattern length). With such configuration, a change of the signal strength due to a change of the connecting pattern length is prevented from occurring.

In the above-mentioned electromagnetic induction-type absolute position transducer, it is preferable that at least part of the pattern widths may be gradually increased as the connecting pattern length becomes longer with respect to a shortest connecting pattern.

Further, according to the present invention, there is provided a position measuring device which uses the above-mentioned electromagnetic induction-type absolute position transducer.

In the electromagnetic induction-type absolute position transducer and the position measuring device using the same according to the present invention, in the scale pattern where the loop portions are arranged at constant pitches (in the related art, the first loop portions are arranged at the pitch $\lambda 1$, and the second loop portions at the pitch $\lambda 2$), at least part of the pattern widths constructing the scale loop are changed depending on the connecting pattern length without changing the pitches and the loop center distances of the first and second loop portions. For example, at least part of the pattern widths is stepwisely (gradually) increased as the connecting pattern length becomes longer with respect to the shortest connecting pattern (in this example, the 0-th scale loop: also referred to as a scale coil). According to this configuration, the amount of the attenuation of the signal strength due to increase of the scale length such as that indicated by the solid line A in FIG. 14 can be complemented by increasing the current flowing through the scale loop. Therefore, attenuation of the signal strength depending on increase of the connecting pattern length is prevented from occurring, whereby the strength of the output signal of the readhead can be kept to be constant as indicated by the solid line B in FIG. 14.

DETAILED DESCRIPTION OF THE INVENTION

Hereinafter, embodiments of the invention will be described in detail with reference to the accompanying drawings.

Figure 1:
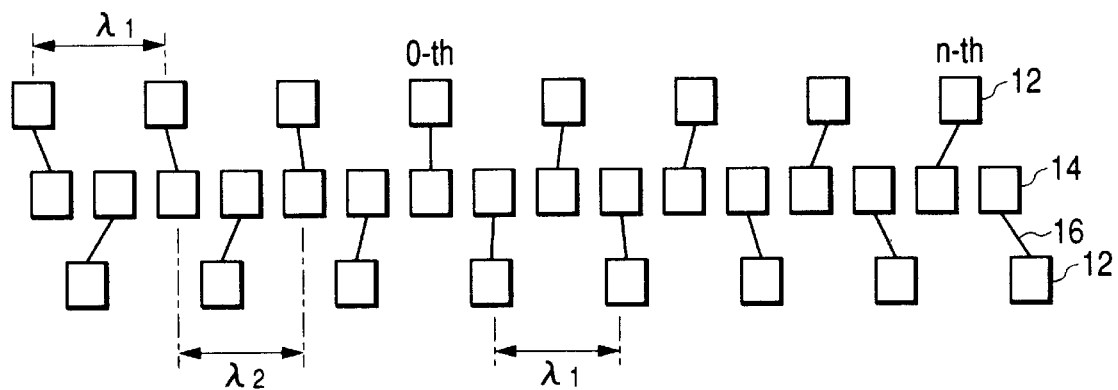
FIG. 1 is a plan view showing a scale pattern of an electromagnetic induction-type absolute position transducer according to a first embodiment of the present invention.
Figure 2:
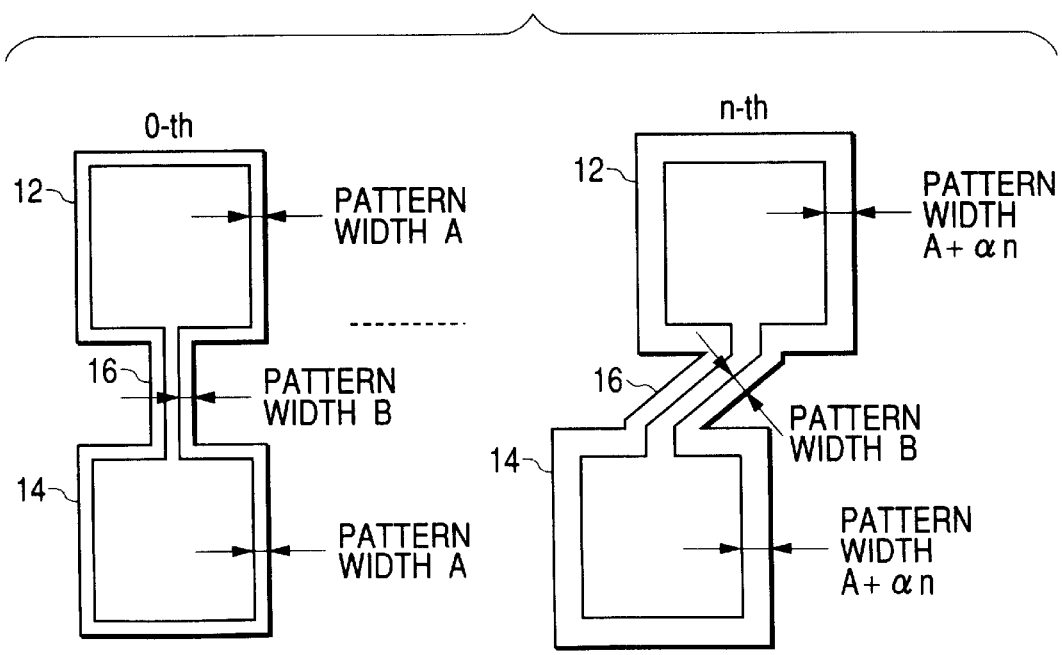
FIG. 2 is an enlarged view of main portions of the scale loops of FIG. 1.
Figure 10:
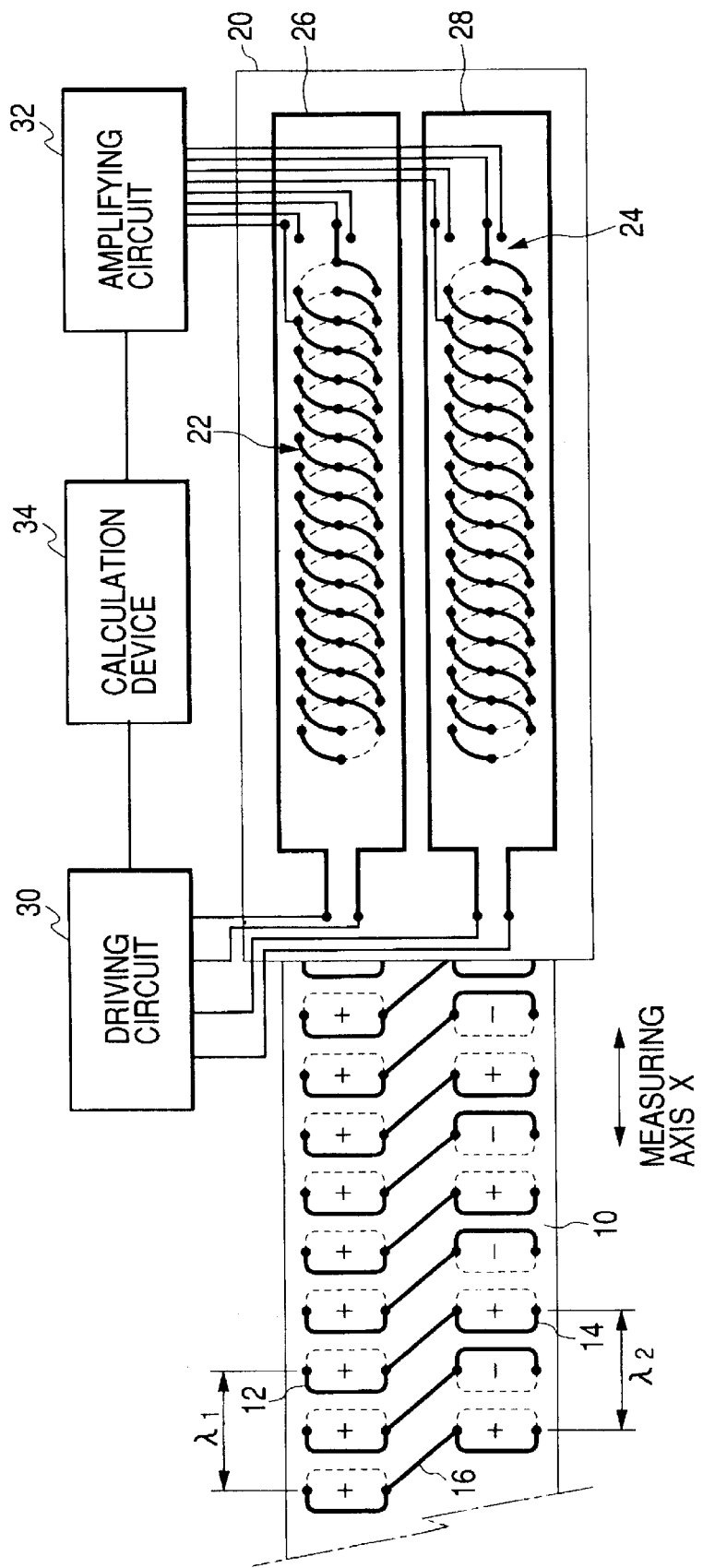
FIG. 10 is a plan view showing the configuration of the electromagnetic induction-type absolute position transducer in the related art.
Figure 11:
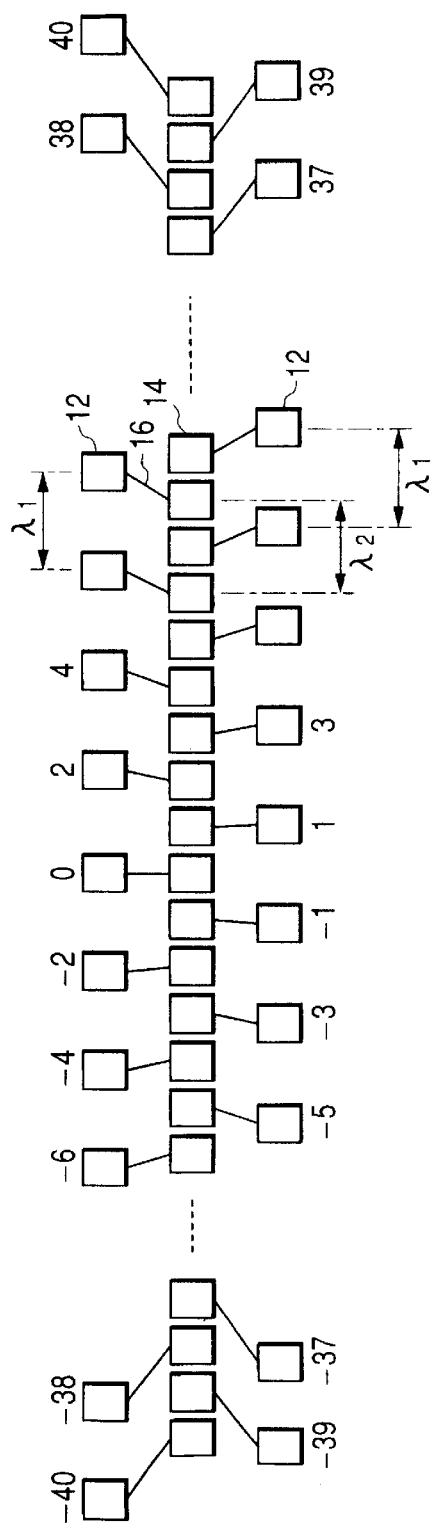
FIG. 11 is a plan view showing a modification of a scale pattern of FIG. 10.
Figure 12:
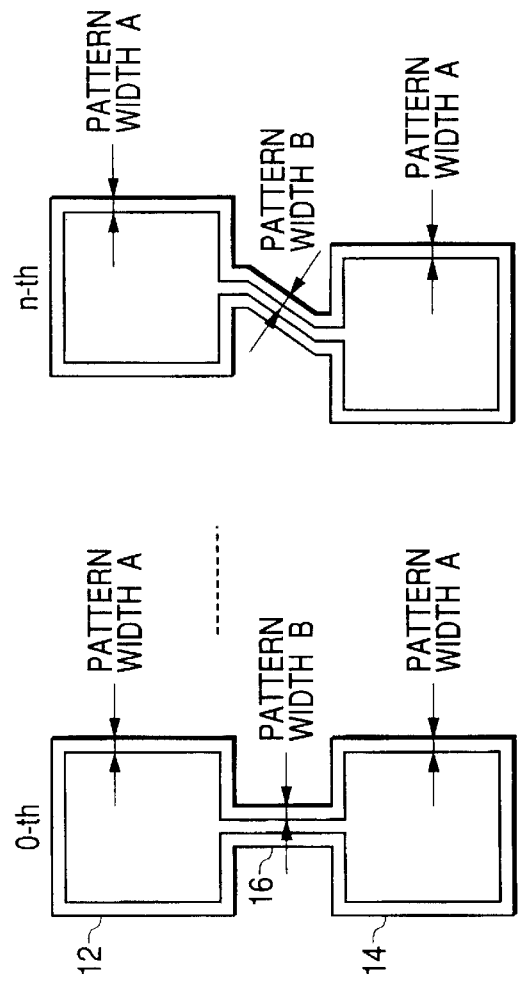
FIG. 12 is a partially enlarged view of a scale loop of FIG. 10.
Figure 13:
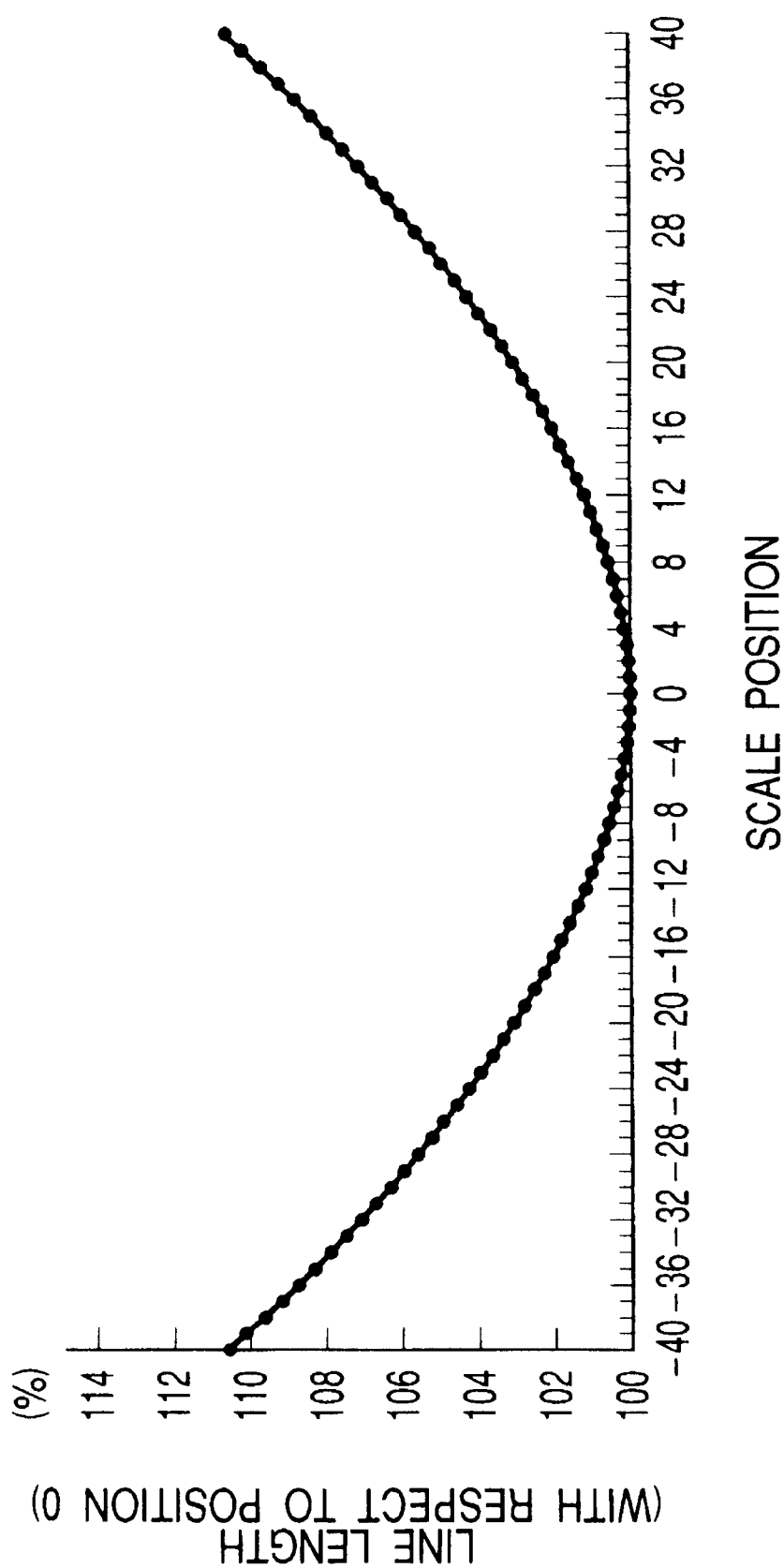
FIG. 13 is a graph showing variation of the signal strength with respect to the scale loop length in the related art.
Figure 14:
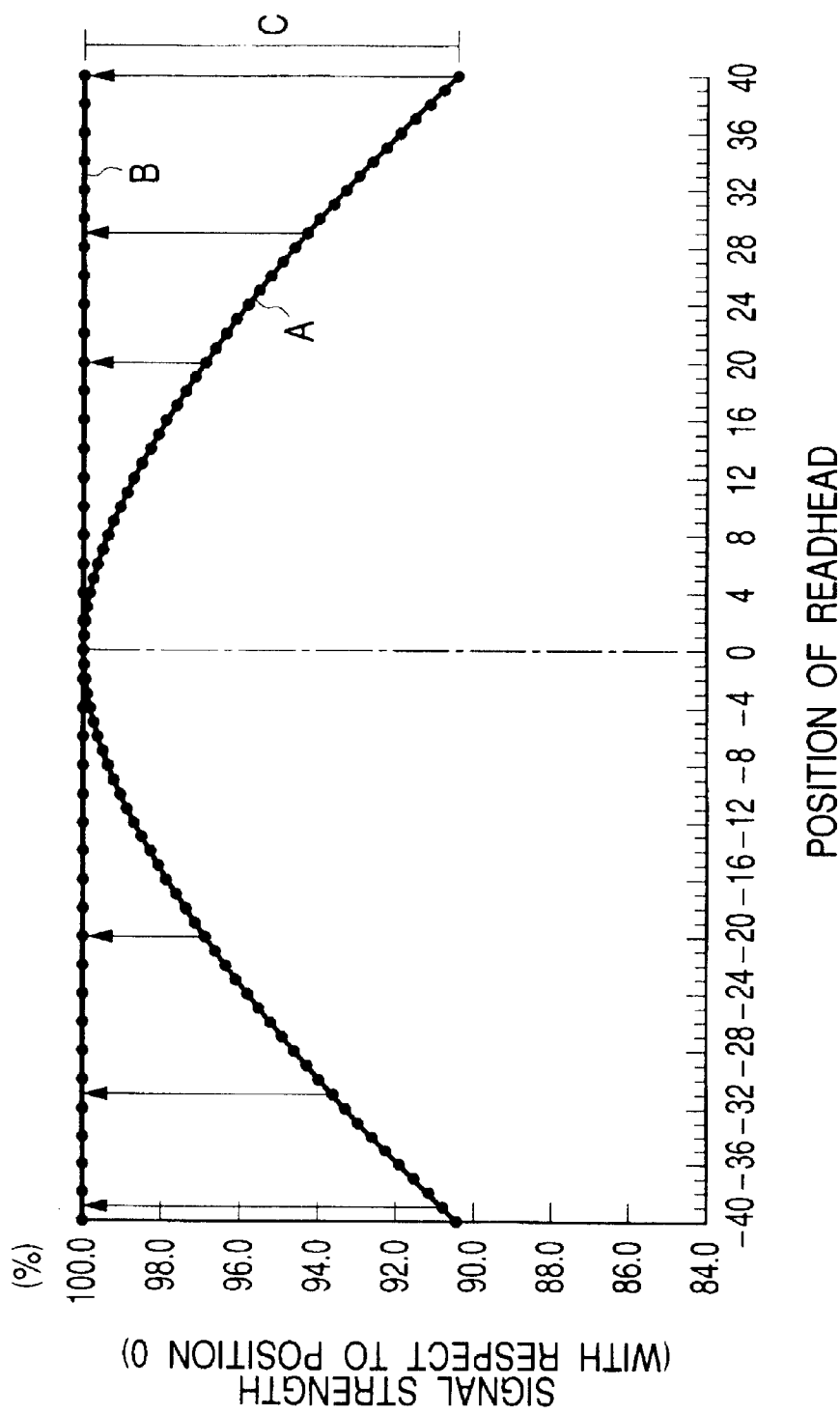
FIG. 14 is a graph showing the changing state of a signal strength depending on the scale position in the related art and the present invention.

FIG. 1 is a plan view showing a scale pattern of an electromagnetic induction-type absolute position transducer according to a first embodiment of the present invention. FIG. 2 is an enlarged view showing enlargedly 0-th and n-th scale patterns. The electromagnetic induction-type absolute position transducer according to the first embodiment of the invention has the same structure as that of the related art transducer shown in FIGS. 10 or 11 except for the pattern width of the scale loop. In transducer according to the first embodiment of the invention, as shown in FIGS. 1 and 2, the pattern widths of the first loop portion 12 and the second loop portion 14 are sequentially increased by an with respect to the 0-th scale loop which is the shortest connecting pattern, so that the pattern width of the n-th scale loop is A+αn. Here, the pattern widths of the first loop portion 12 and the second loop portion 14 at the 0-th scale loop are A, and the pattern width of the connecting pattern portion 16 at the 0-th scale loop is B. That is, the current flowing the scale loop is increased by increasing the pattern widths of the scale loops as the scale length becomes larger. By doing so, the amount of attenuation of the signal strength depending on the increase of the scale length as indicated by a solid line A shown in FIG. 14 is complemented by the increase of the current flowing the scale loop. Accordingly, the attenuation of the signal strength depending on the increase of connecting pattern length is prevented from occurring, and as indicated by a solid line B shown in FIG. 14, the strength of output signal of the readhead can be kept to be constant.

Figure 3:
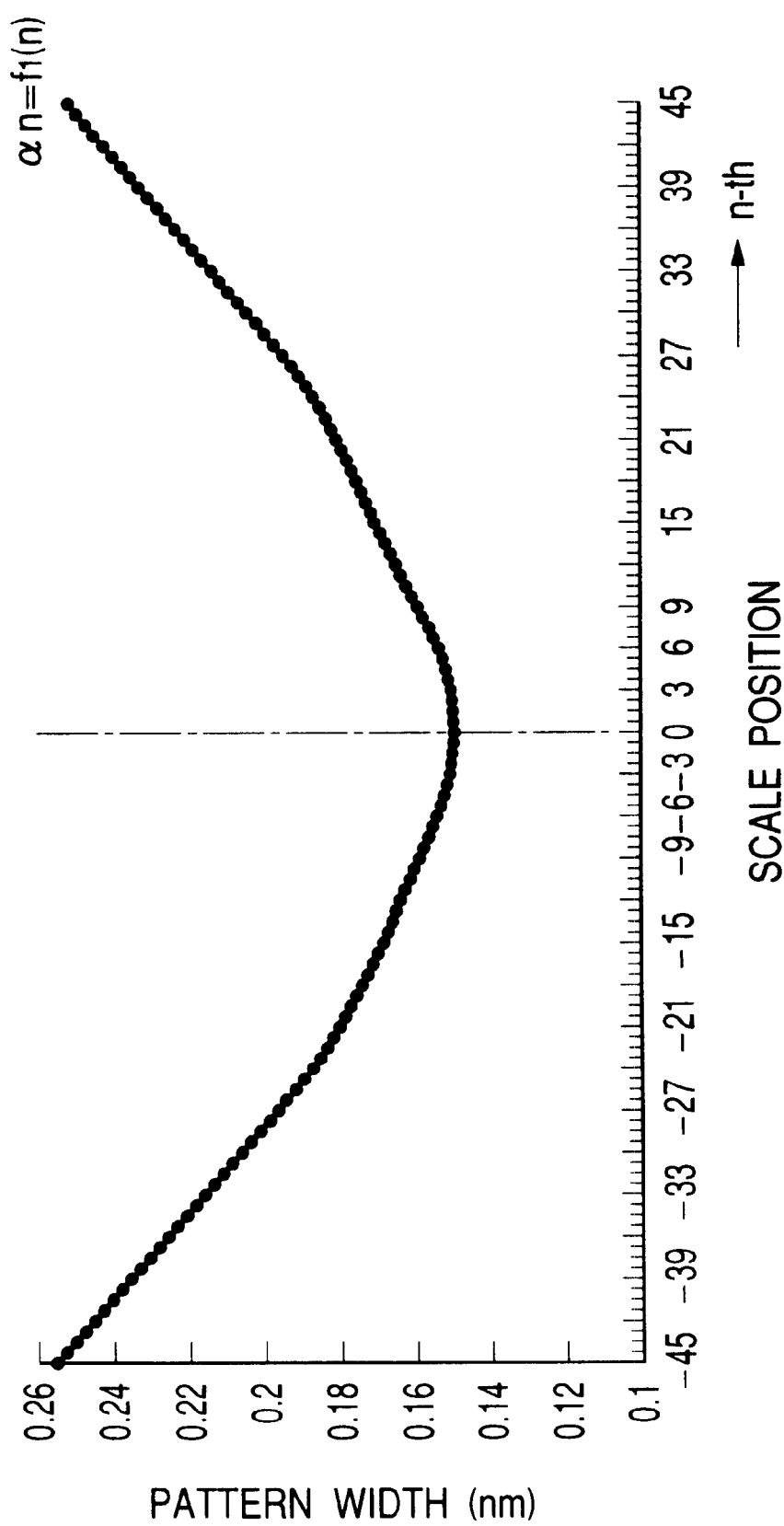
FIG. 3 is a graph showing an example of the changing state of the pattern width depending on the scale position in the first embodiment.

An example of the pattern width A+αn in the first embodiment is shown in FIG. 3 in which the pattern width is linearly approximated by function f1(n)=A+αn.

In the first embodiment, the widths of both the first loop portion 12 and the second loop portion 14 are increased. Therefore, the signal strength can be ensured by a relatively small increased amount of the pattern width(or the vale an which is relatively small).

Figure 4A:
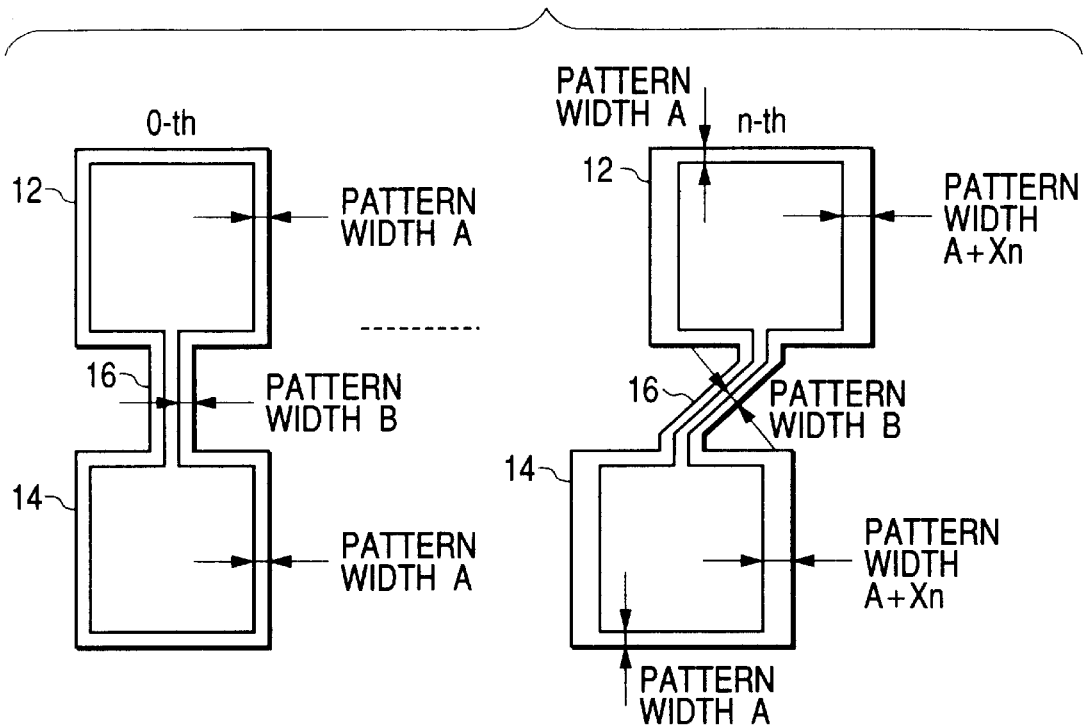
FIG. 4A is an enlarged plan view showing a scale pattern of an electromagnetic induction-type absolute position transducer according to a second embodiment of the present invention.

FIG. 4A shows an electromagnetic induction-type absolute position transducer according to a second embodiment of the present invention. In the second embodiment of the invention, as shown in FIG. 4A, only the widths of the first loop portion 12 and the second loop portion 14 in the direction of the measuring axis X are sequentially increased by Xn (>αn), so that the widths of the n-th scale loop is A+Xn.

According to the second embodiment, the signal strength can be ensured without increasing the pattern widths in the direction perpendicular to the measuring axis X.

Figure 4B:
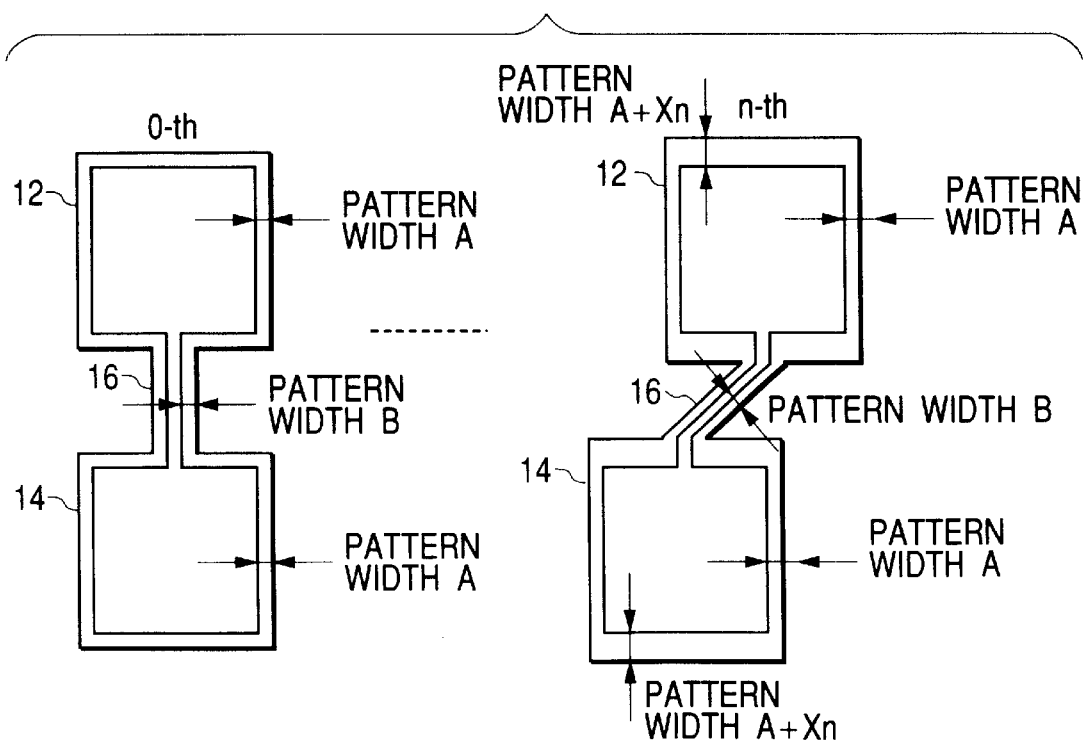
FIG. 4B is an enlarged plan view showing another example of scale pattern of the electromagnetic induction-type absolute position transducer according to the second embodiment of the present invention.

In contrast, as shown in FIG. 4B, only the widths of the first loop portion 12 and the second loop portion 14 in the direction perpendicular to the measuring axis X may be sequentially increased by Xn (>αn), so that the widths of the n-th scale loop is A+Xn. With such configuration, the signal strength can be ensured without increasing the pattern widths in the direction of the measuring axis X).

Figure 5:
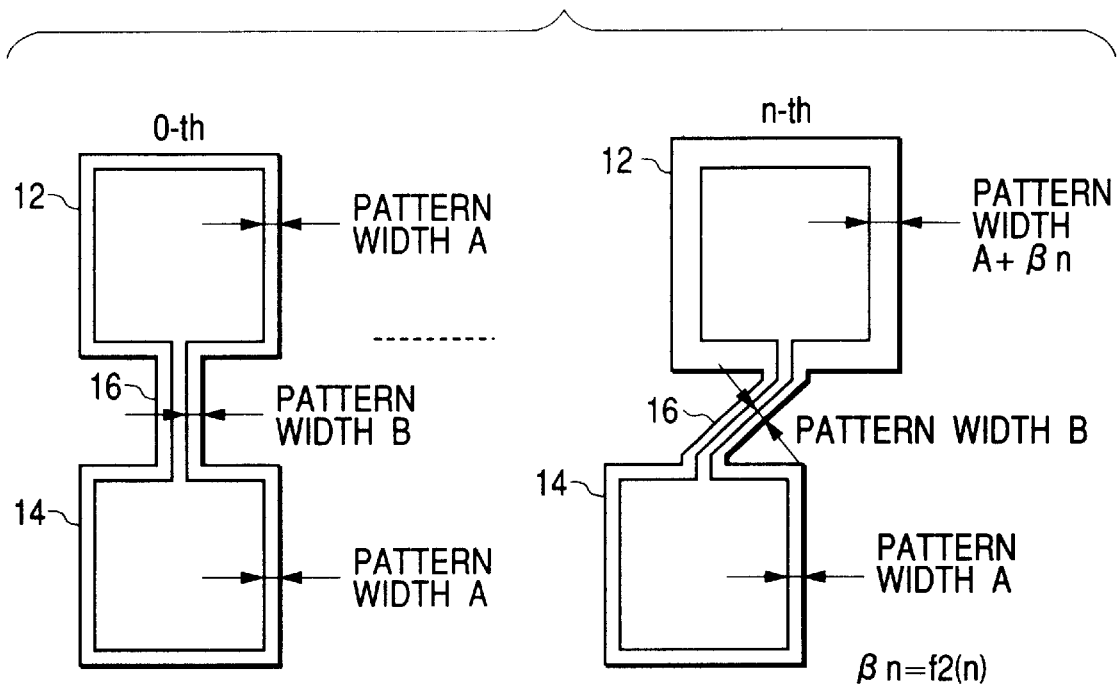
FIG. 5 is an enlarged plan view showing a scale pattern of an electromagnetic induction-type absolute position transducer according to a third embodiment of the present invention.

FIG. 5 shows an electromagnetic induction-type absolute position transducer according to a third embodiment of the present invention. In the third embodiment of the invention, as shown in FIG. 5, only the widths of the first loop portion 12 are sequentially increased by βn (=f2(n)>αn), so that the widths of the n-th scale loop is A+βn.

According to the third embodiment, the signal strength can be ensured without changing the pattern witdhs of the second loop portions 14 and the connecting pattern portions 16.

Figure 6:
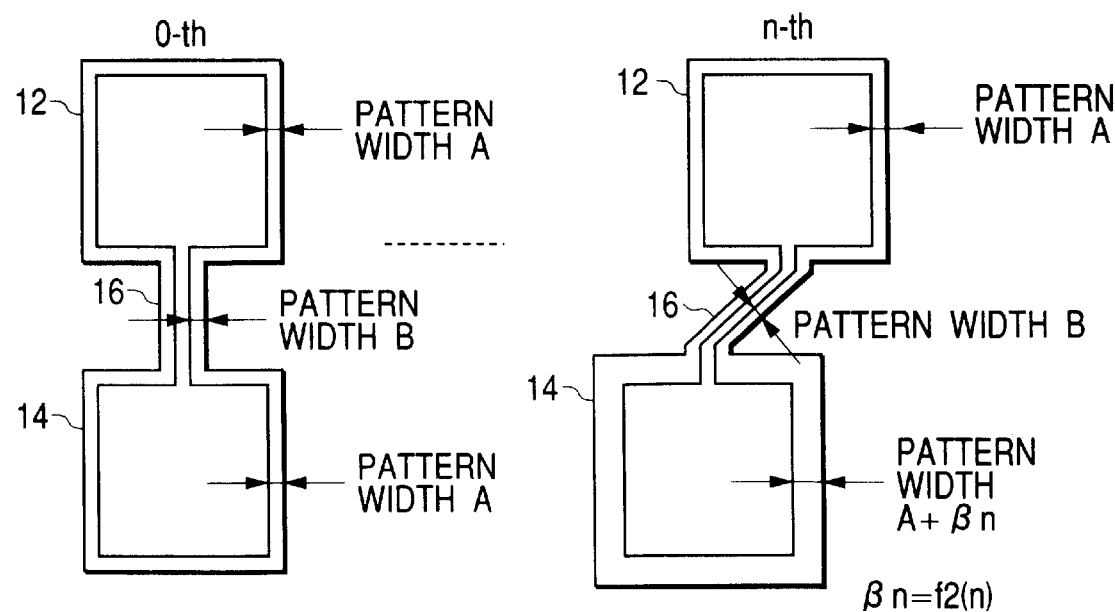
FIG. 6 is an enlarged plan view showing a scale pattern of an electromagnetic induction-type absolute position transducer according to a fourth embodiment of the present invention.

FIG. 6 shows an electromagnetic induction-type absolute position transducer according to a fourth embodiment of the present invention. In the fourth embodiment of the invention, as shown in FIG. 6, only the widths of the second loop portions 14 are sequentially increased by βn (=f2(n) >αn), so that the widths of the n-th scale loop is A+βn.

According to the fourth embodiment, the signal strength can be ensured without changing the pattern widths of the first loop portions 12 and the connecting pattern portions 16.

Figure 7:
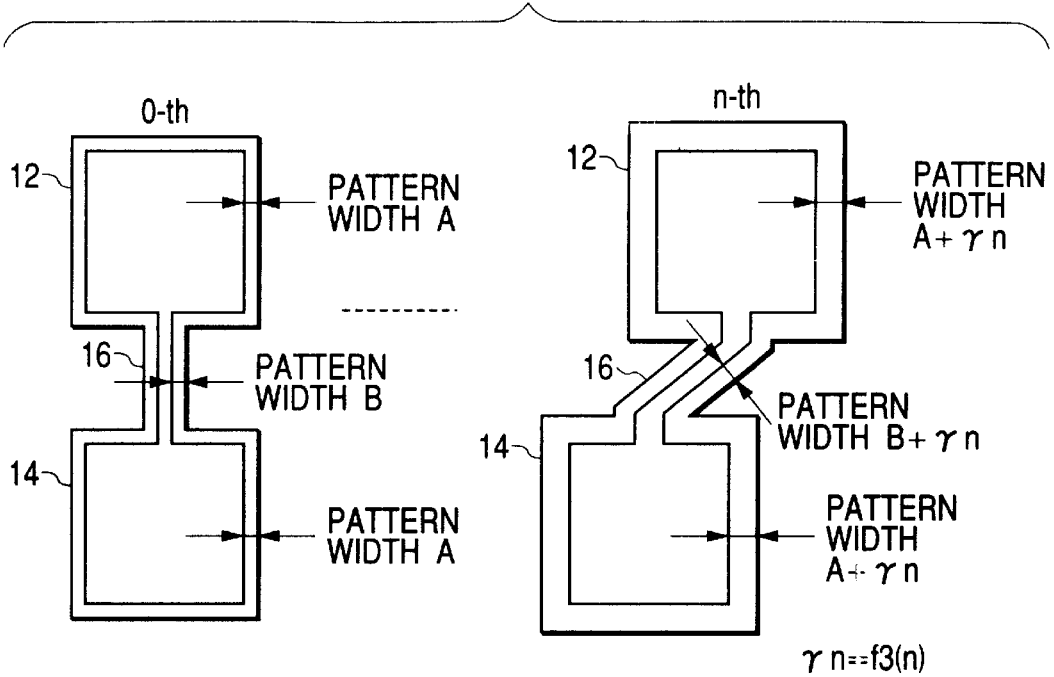
FIG. 7 is an enlarged plan view showing a scale pattern of an electromagnetic induction-type absolute position transducer according to a fifth embodiment of the present invention.

FIG. 7 shows an electromagnetic induction-type absolute position transducer according to a fifth embodiment of the present invention. In the fifth embodiment of the invention, as shown in FIG. 7, the widths of all the first loop portions 12, the second loop portions 14, and the connecting pattern portions 16 are sequentially increased by γn (=f3(n)<αn), so that the pattern widths of the first loop portion 12 and the second loop portion 14 are A+γn, and the pattern widths of the connecting pattern portion 16 of the n-th scale loop are B+γn.

According to the fifth embodiment, the increased amount of the pattern width can be minimized.

Figure 9:
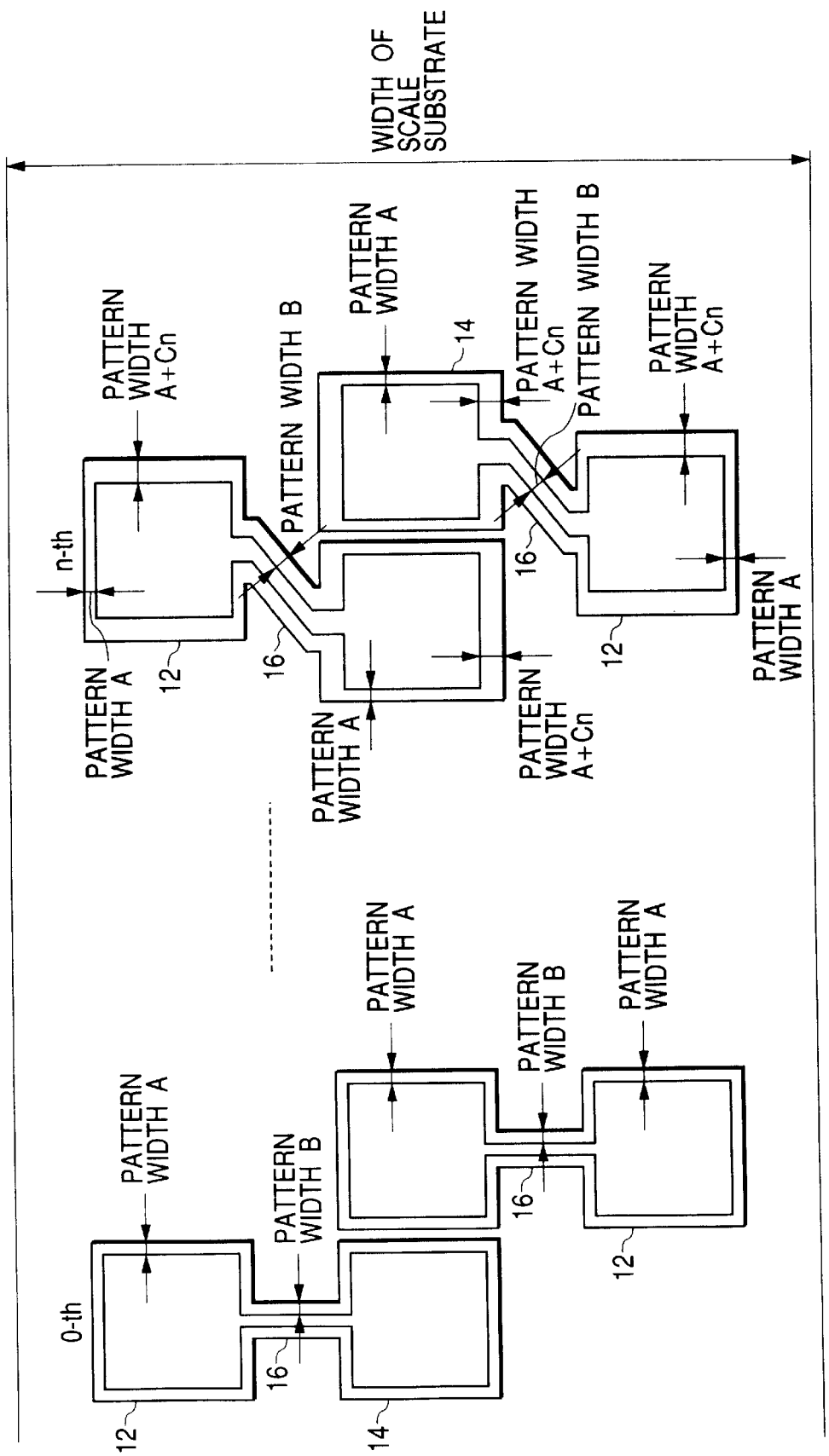
FIG. 9 is a plan view showing another embodiment of scale pattern of an electromagnetic induction-type absolute position transducer according to the present invention.

In all embodiments described above, the patterns of the embodiments are independently used. Alternatively, the patterns of the embodiments may be combinedly used in accordance with the scale position. For example, a scale pattern may be formed such that the pattern widths in the direction of measuring axis of center side loop portions are sequentially increased while the pattern widths in the direction perpendicular to the measuring axis of outer side loop portions are sequentially increased. FIG. 9 shows a scale pattern where the first loop portions 12 are alternately arranged on both the sides of the second loop portions 14. In such scale pattern, the pattern widths in the direction perpendicular to the measuring axis of the first loop portions 12 (outer side loop portions) are sequentially increased by Cn (>αn), so that the pattern widths of the n-th scale loop is A+Cn. In contrast, the pattern widths in the direction of the measuring axis of the second loop portions 14 (center side loop portions) are sequentially increased by Cn (>αn), so that the pattern widths of the n-th scale loop is A+Cn. With such configuration, the interference of the adjoining coils which is caused by increase in the pattern widths in the direction perpendicular to the measuring axis of the center side loop portions is prevented from occurring. Further, the outer side loop portions stuck out from the width of the scale substrate which is caused by increase in the pattern widths in the direction of the measuring axis of the outer side loop portions is prevented from occuring.

In all the embodiments, the signal strength which is obtained only in a center area in the related art can be obtained in all scale positions. In the related art, also the gap allowable range between the readhead and scale is limited as indicated by the zone D in FIG. 8 in accordance with the variation width C of the signal strength which is changed depending on the scale position from the solid line B (the center area) to the solid line A (the end areas). By contrast, after the invention is applied, the signal strength such as that indicated by the solid line B is obtained irrespective of the scale position, and hence the gap allowable range can be widened as indicated by the zone E.

In all the embodiments, the number of the tracks is two and a two-phase receiving coil is configured. The application of the invention is not restricted to this. The invention may be applied also to a transducer having three or more tracks, or a single-phase receiving coil.

The invention can be applied to the whole of position measuring devices using an absolute position transducer which is of the electromagnetic induction-type, and which has tracks of two or more wavelengths, such as an electronic caliper, an electronic micrometer, an indicator, a linear scale, and a linear gauge. The transducer may be singly used.

Figure 8:
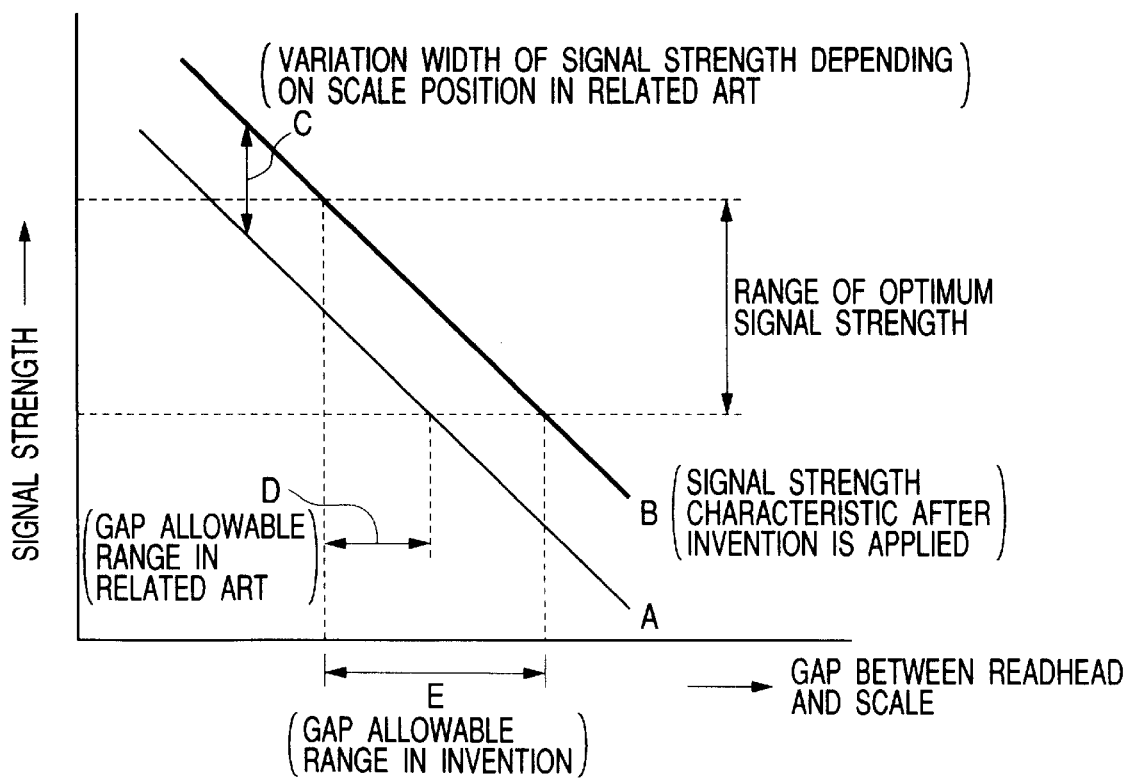
FIG. 8 is a graph showing an example of relationships of the gap between the readhead and the scale, and the signal strength.

According to the invention, the same signal strength as that which is obtained in the center area can be obtained irrespective of the scale position, and hence the gap setting range can be widened as described with reference to FIG. 8. Since the signal strength is constant irrespective of the scale position, amplification setting (such as auto gain) of an amplifying circuit can be easily conducted so that the signal strength is located at the center of the optimum signal strength. Further, the accuracy can be stabilized. Furthermore, in the case where an erroneous operation due to, for example, the readhead or a breakage of the scale is detected on the basis of the signal strength as proposed by the assignee of the invention in U.S. patent application Ser. No. 09/804,300, the judgement criterion can be set to be severer than that in the related art. Therefore, even a minute change of the accuracy can be accurately detected with high sensitivity.

What is claimed is:

1. An electromagnetic induction-type absolute position transducer comprising a scale having a plurality of scale loops functioning as coils, said scale loops including:

a set of loop portions including at least two loop portions which are arranged along a measuring axis at different wavelength intervals to constitute a plurality of tracks arranged along the measuring axis at different wavelengths; and a connecting pattern portion connecting the corresponding two loop portions with each other, wherein at least part of pattern widths constituting said scale loops are changed in accordance with a length of the connecting pattern portion.

2. The electromagnetic induction-type absolute position transducer according to claim 1, wherein at least part of said pattern widths are gradually increased as the length of the connecting pattern portion becomes longer with respect to the shortest length connecting pattern portion.

3. The electromagnetic induction-type absolute position transducer according to claim 2, wherein the pattern widths of the set of loop portions are gradually increased.

4. The electromagnetic induction-type absolute position transducer according to claim 3, wherein the pattern widths in the direction perpendicular to the measuring axis of the set of loop portions are gradually increased.

5. The electromagnetic induction-type absolute position transducer according to claim 2, wherein the pattern widths of at least one loop portion of the set of loop portions are gradually increased.

6. The electromagnetic induction-type absolute position transducer according to claim 2, wherein the pattern widths of the set of loop portions and connecting loop portion are gradually increased.

7. A position measuring device which uses an electromagnetic induction-type absolute position transducer according to claim 1.

* * * * *